(12) United States Patent
Freeman

(10) Patent No.: US 6,389,731 B1
(45) Date of Patent: May 21, 2002

(54) FISH HOLDER

(76) Inventor: Timothy L. Freeman, 255 E. Irvine Rd., Mobile, AL (US) 36606

( * ) Notice: Subject to any disclaimer, the term of this patent is extended or adjusted under 35 U.S.C. 154(b) by 0 days.

(21) Appl. No.: 09/547,231

(22) Filed: Apr. 11, 2000

(51) Int. Cl.[7] .................................................. A01K 1/00
(52) U.S. Cl. .................................. 43/4; 43/53.5; 43/55
(58) Field of Search ................................ 43/4, 53.5–55

(56) References Cited

U.S. PATENT DOCUMENTS

| | | | | |
|---|---|---|---|---|
| 2,189,478 A | * | 2/1940 | St. George | 43/4 |
| 2,741,061 A | * | 4/1956 | Harrison | 43/53.5 |
| 2,750,705 A | * | 6/1956 | Keveney | 43/53.5 |
| 2,918,747 A | * | 12/1959 | Terlecky | 43/53.5 |
| 3,389,491 A | * | 6/1968 | Lowery | 43/53.5 |
| 3,556,507 A | * | 1/1971 | Haskell | 43/53.5 |
| 3,807,080 A | * | 4/1974 | Reynolds | 43/53.5 |
| 3,968,588 A | * | 7/1976 | Peterson | 43/53.5 |
| 5,809,686 A | * | 9/1998 | Abby | 43/4 |

* cited by examiner

Primary Examiner—Kurt Rowan
(74) Attorney, Agent, or Firm—George L. Williamson

(57) ABSTRACT

The present invention discloses a handless fish holder for holding fish while the hook is removed from the fish by the hands of the user. The present invention discloses a horizontally mounted platform having a pair of fixedly mounted jaws thereon having a first movable jaw pivotably being interposed between two fixed jaws whereby a fish can be held between the jaws. The movable jaw has a means for being locked in an open position and is spring tensioned toward the two fixed jaws. The platform is mounted on an upright standing arm-like member being adjustable vertically with the platform being 360 degrees rotatable. The upright standing arm is mounted on a U-shaped member having a threaded clamp member which can be attached to a boat seat or side or like platform.

11 Claims, 2 Drawing Sheets

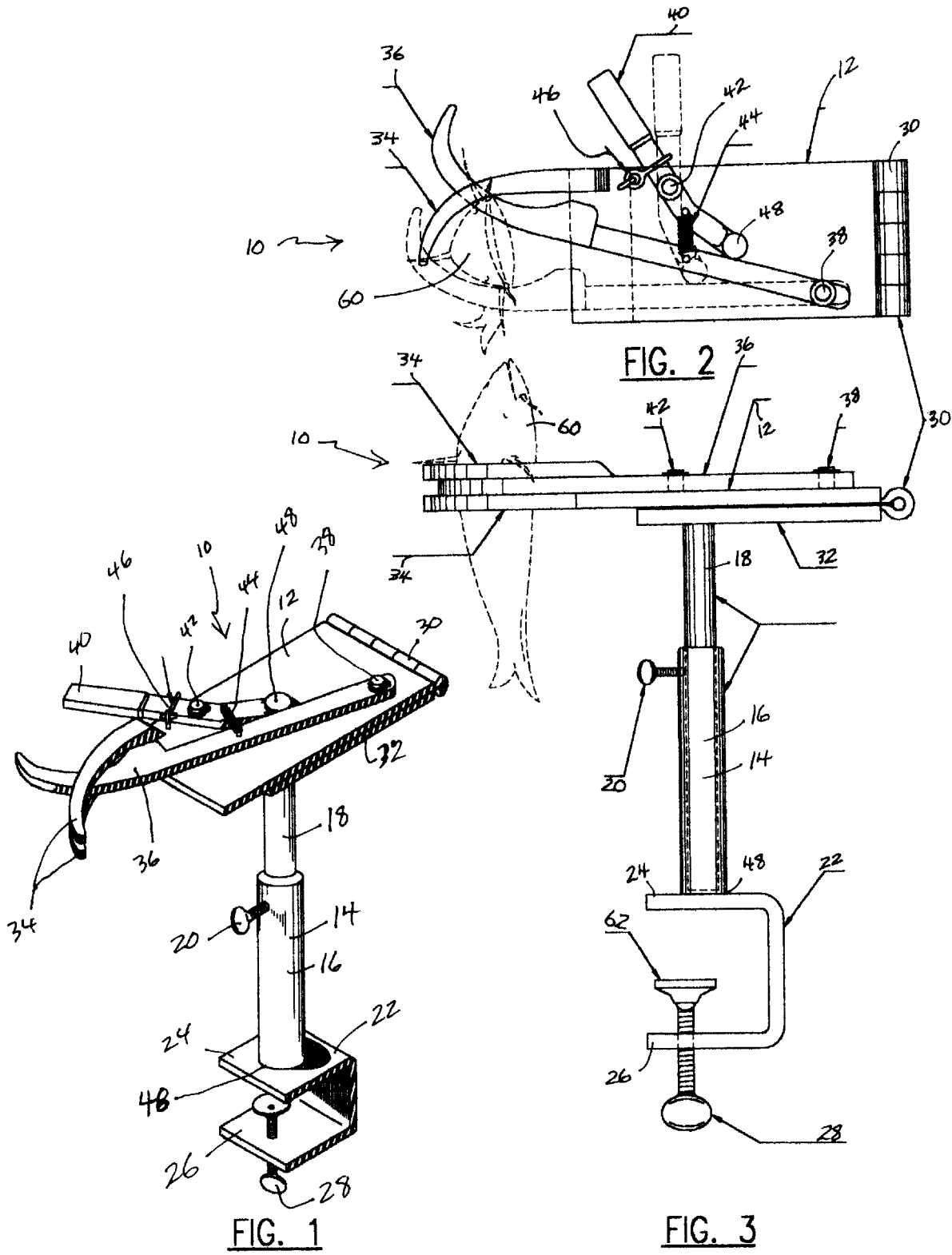

FISH HOLDER

BACKGROUND OF THE INVENTION

1. Field of the Invention

The present invention relates generally to fish holders and more particularly, is concerned with a fish holder having jaws and a portable mounting means.

2. Description of the Prior Art

Devices for fish holders have been described in the prior art. However, none of the prior art devices disclose the unique features of the present invention.

In U.S. Pat. No. 5,098,338, dated Mar. 24, 1992, Jensen disclosed a compact, easy to store, portable fish cleaner device capable of removably attaching to the outside surface of the gunwale of a boat. The device includes a V-shaped trough member capable of holding a fish for cutting over the water along the outside surface of the boat. The trough member comprises two angled surfaces pivotally attached along one edge. The ends of the trough member are open and a drain gap is created between the angled surfaces so that fish entails and other waste material may be easily washed into the water. A plurality of support members is attached to the gunwale and supports the trough member in place over the water. Support member attachment means are used to removably attach each support member to the outside surface of the gunwale. Hook and loop connectors are provided between the trough member and the support members to adjustably attach them together. In the preferred embodiment, a horizontally flat cutting board is attached to one edge of the trough member enabling one to more easily remove the fish's tail and head.

In U.S. Pat. No. 4,559,853, dated Dec. 24, 1985, Oye disclosed a pliers like tool having a transversely extended lower anvil portion replacing a person's index finger and a smaller hammer portion taking the place of a person's thumb in gripping the lower lip of a fish in place of the index finger below the lower lip and the thumb of the same hand sticking into the fish's mouth holding the fish in a relaxed state with its mouth open. This facilitates removal of the fish hook safely from the fish without injury to the person and minimal injury to the fish. The anvil portion and the smaller hammer portion of the tool gripping head are vinyl covered to further avoid injury to fish held by the lower lip gripping tool.

In U.S. Pat. No. 4,196,538, dated Apr. 8, 1980, Crone disclosed an invention which comprises a fish holding apparatus especially adapted to hold eels, catfish, and the like, by arranging an elongated box to be supported vertically and having a slide at one end adapted to serve as a cutting board and also having serrated gripping members at one end which coacts with a fixed serrated gripping member attached to one side of said end of the box for coaction with the gripping members on the slide. The opposite end of the box also has a foot engageably member to hold the box steady, while the slide is being manipulated from an open position in which the fish is extended into the box with the exception of the head and the slide is then moved to engage the head between the serrated members referred to above in order that the mouth of the fish is positioned for removal of the hook therefrom.

In U.S. Pat. No. 4,965,958, dated Oct. 30, 1990, Cedergreen, et al., disclosed a fish holder including a handle having a lower jaw extending transversely therefrom. A trigger is pivotally positioned inside of the handle and includes an upper jaw that extends transversely to the trigger and overlies the lower jaw arm. A biasing spring internally engages the trigger and the handle to maintain the jaw in an open position. When the handle and the trigger are grasped by a hand and squeezed, the jaw will close.

A In U.S. Pat. No. 3,921,327, dated Nov. 25, 1975, Casazza disclosed a fish holder particularly designed to hold a catfish after catching the same in order to remove the hook from the mouth of the fish. The holder includes a pair of opposed jaw elements selectively movable from and towards each other. One of the jaw elements is substantially flat and the second jaw element is of generally C-shaped configuration, and includes a web portion parallel to and spaced from said first jaw, and flange portions which are perpendicular to and disposed adjacent the ends of said first jaw when the jaws are in their closed or operative position. A medial portion of the web of the second maw is provided with a fish spine receiving opening.

In U.S. Pat. No. 3,905,145, dated Sep. 16, 1975, Cunningham disclosed a fish holder intended for use to facilitate the removal of a fishing hook from a freshly caught fish and formed of a funnel-like open ended receptacle having a longitudinal slot extending from end to end to permit a fishing line to be drawn therethrough with the fish thus being drawn through the funnel until its head portion projects through the narrow end with the tail projecting from the open end, and a clamp receiving slot disposed in the funnel adjacent the top narrow end thereof and adapted to receive the end of a serrated clamp thereinto in a manner to engage the gills of a fish in the funnel to secure the fish in the funnel thus allowing the hook to be removed from the fish.

While these fish holders devices may be suitable for the purposes for which they were designed, they would not be as suitable for the purposes of the present invention, as hereinafter described.

SUMMARY OF THE INVENTION

The present invention discloses a handless fish holder for holding fish while the hook is removed from the fish by the hands of the user. The present invention discloses a horizontally mounted platform having a pair of fixedly mounted jaws thereon having a first movable jaw pivotably being interposed between two fixed jaws whereby a fish can be held between the jaws. The movable jaw has a means for being locked in an open position and is spring tensioned toward the two fixed jaws. The platform is mounted on an upright standing arm-like member being adjustable vertically with the platform being 360 degrees rotatable. The upright standing arm is mounted on a U-shaped member having a threaded clamp member which can be attached to a boat seat or side or like platform.

An object of the present invention is to allow a fish to be handled in such a way that the user does not touch the fish with his hands. A further object of the present invention is to allow a fish to be handled and then dropped immediately back into the water without the user touching the fish. A further object of the present invention is to provide a fish holder which is rotatable and otherwise adjustable so that it can be used in a number of environments.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is a perspective view of the present invention.

FIG. 2 is a plan view of the present invention.

FIG. 3 is a side elevation view of the present invention.

LIST OF REFERENCE NUMERALS

Figure 4:
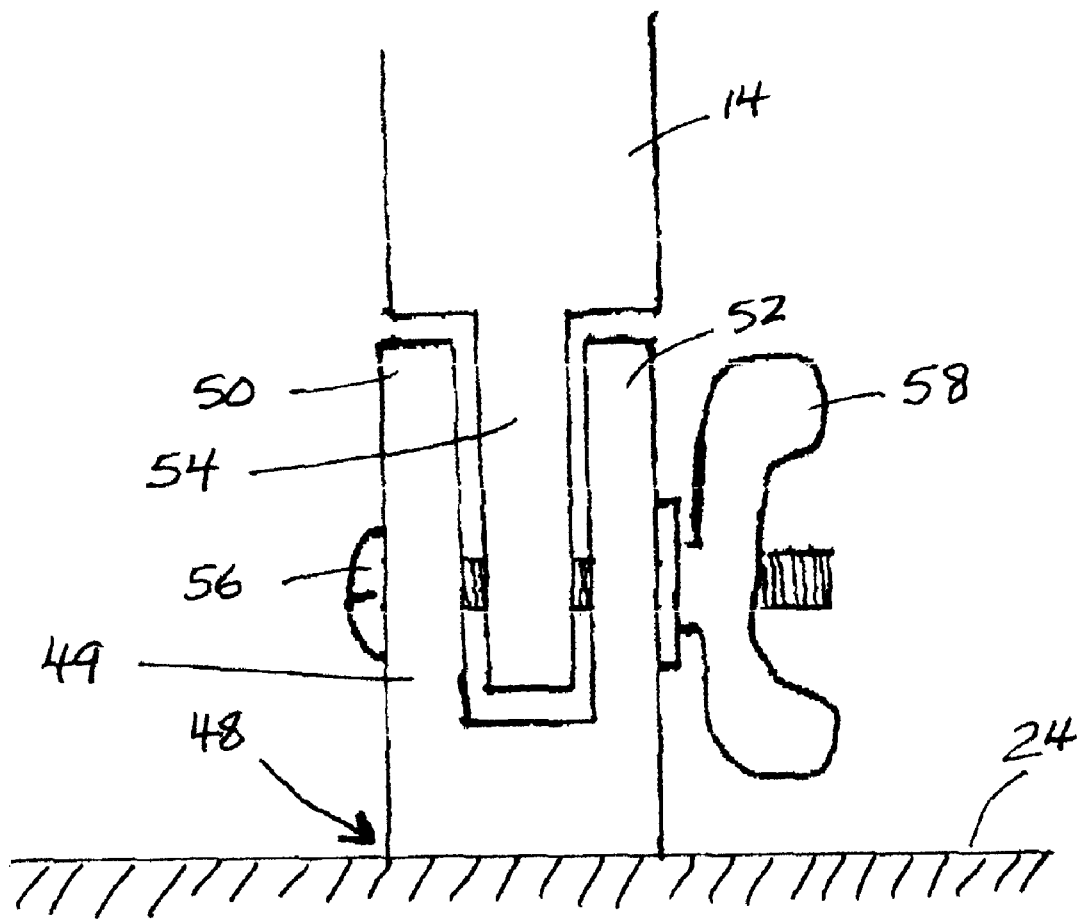
FIG. 4 is a partial elevation of a detail of the present invention.

With regard to reference numerals used, the following numbering is used throughout the drawings
10 present invention
12 upper platform
14 rod
16 outer rod
18 inner rod
20 threaded means
22 clamp
24 upper arm
26 lower arm
28 threaded means
30 hinge
32 lower platform
34 fixed jaw
36 pivotable jaw
38 pivot
40 locking arm
42 pivot
44 spring
46 latch
48 attachment point
49 pivot member
50 pivot flange
52 pivot flange
54 pivot member
56 bolt
58 nut
60 fish

DESCRIPTION OF THE PREFERRED EMBODIMENT(S)

Turning now descriptively to the drawings, in which similar reference characters denote similar elements throughout the several views, FIGS. 1 through 4 illustrate the present invention wherein a handless fish holder is disclosed.

Turning to FIG. 1, therein is shown a perspective view of the present invention 10. Shown therein is an upper part of the plate or platform 12 connected by hinges 30 to a second lower plate 32. The lower plate 32 is fixedly connected to an inner arm 18 which is slidably adjustable inside a lower member 14 being a larger outer member 16 having a threaded adjustment means 20 mounted thereon wherein inner member 18 can be vertically adjusted and 360 degree rotatable. Upright standing member 14 is fixedly attached at 48 to a lower, U-shaped clamp member 22 having an upper arm portion 24 and a lower portion 26 with the lower arm portion 26 having mounted therein a threaded member 28 which is a threaded clamping means. Upper platform 12, has fixedly mounted and attached thereon a pair of spaced about arms 34 fixedly attached to the platform 12 having a pivotable arm 36 pivotable at 38 which pivotable arm 36 is interposed between arms 34 when in the closed position. Pivotable arm 36 pivots at pivot 38 in the horizontal plane. Also shown is a locking arm 40 which pivots at 42 having a head or contact member 48 which is contiguous to pivotable arm 36 and holds arm 36 in the open position. Also shown is a spring member 44 which urges pivotable jaw 36 toward jaws 34 and a latch means 46 which maintains locking arm 40 in a locked position.

Turning to FIG. 2, therein is shown a plan view of the present invention 10. Shown therein is an upper part of the plate or platform 12 connected by hinges 30 to a second lower plate 32 (not shown). Upper platform 12, has fixedly mounted and attached thereon a pair of spaced about arms 34 fixedly attached to the platform 12 having a pivotable arm 36 pivotable at 38 which pivotable jaw 36 is interposed between jaws 34 when in the closed position. Pivotable arm 36 pivots at pivot 38. Also shown is a locking arm 40 which pivots at 42 having a head or contact member 48 which contacts pivotable arm 36 and holds arm 36 in the open position for receiving fish 60. Also shown is a spring member 44 which urges pivotable arm 36 toward locking member 40 and a latch means which maintains locking arm 40 in a locked position or closed position when not receiving a fish. In operation, the fish is held on the line while the jaws of the fish holder are open and the fish is placed within the jaws whereby the hook is then removed from the fish's mouth. The jaws are then opened and the fish is allowed to fall back in the water in such a way that human hands never touch the fish. Alternatively, the fish holder can be attached over an ice chest where the fish is allowed to fall into the ice chest or live well of the boat.

Turning to FIG. 3, shown therein is a side elevation view of the present invention 10. Shown therein is an upper part of the plate or platform 12 connected by hinges 30 to a second lower plate 32. The lower plate 32 is fixedly connected to an inner arm 18 which is slidably adjustable inside a lower member 14 being a larger outer member 16 having a threaded adjustment means 20 mounted thereon wherein inner member 18 can be vertically adjusted. Upright standing member 14 is fixedly attached at 48 to a lower clamp member 22 having an upper portion 24 and a lower portion 26 with the lower portion 26 having mounted therein a threaded member 28 which has a threaded clamping means 62 attached thereto. Upper platform 12, has fixedly mounted and attached thereon are a pair of spaced about arms 34 fixedly attached to the platform 12 having a pivotable arm 36 pivotable at 38 which pivotable arm 36 is interposed between arms 34 when in the closed position. Pivotable arm 36 pivots at pivot 38. Pivot 42 is also shown along with fish 60. Platform 12 is about 180 to 270 degrees rotatable about hinge 30.

Turning to FIG. 4, shown therein is a detailed view of the present invention 10. Shown therein is an alternative adjustable means for attaching arm 14 to upper part 24 of clamp member 22 at point 48. Shown in FIG. 4 is the upper arm member 14 pivotally attached to upper part 24 of clamp 22 by means of a U-shaped pivotable member 49 wherein pivotable members 49 have two arms 50, 52 sandwiched around another arm 54 extending from arm 14 having a male threaded member 56 and a female receiving threaded member or wing nut 58 for providing fastening means to the pivotable assembly. This allows the clamp 22 to be mounted alternatively to either a horizontal or a vertical member and maintain arm 14 vertical being pivotable through an angle of about 180 degrees.

Many specific details contained in the above description merely illustrate some preferred embodiments and should not be construed as a limitation on the scope of the invention. Many other variations are possible.

I claim:

1. An apparatus for a fish holder, comprising:
   a) a first generally horizontal upper platform; having an upper surface
   b) a second generally horizontal upper platform, said second upper platform having an upper surface and an underside, said first upper platform disposed above said second upper platform;
   c) means for hingedly connecting said first and second upper platforms;
   d) a rod connected to the underside of said second upper platform, said rod having a lower distal end;
   e) means for clamping disposed on the lower distal end of said upright standing arm; and,
   f) means for holding a fish attached to the upper surface of said first upper platform; said means for holding a fish further comprising:
      a first jaw, a second jaw and a third jaw disposed on said first upper platform so that said first jaw is disposed above the second jaw, having a space therein between said first and second jaws for receiving said third jaw.

2. The apparatus of claim 1, wherein said third jaw is pivotably mounted so that said third jaw pivots in the horizontal plane upon the top surface of said first upper platform, said third jaw pivoting from a first open position to a second closed position, said first open position for receiving a fish.

3. The apparatus of claim 2, further comprising means for locking said third jaw in a first open position.

4. The apparatus of claim 3, said means for locking further comprising a pivotable rod member having one end for contacting said third pivotable jaw, a second end serving as a handle, having said pivot disposed approximately intermediately of said first and second end.

5. The apparatus of claim 4, further comprising a spring means for urging said third pivotable jaw toward said pivotable rod member.

6. The apparatus of claim 5, further comprising a means for latching said pivotable rod member to said first upper platform whereby said pivotable rod member is in said second closed position.

7. The apparatus of claim 1, wherein said means for hingedly connecting said first and second upper platform is reversibly pivotable whereby said first upper platform can be folded backwardly greater than 180 degrees but less than 270 degrees.

8. The apparatus of claim 1, said rod further comprises a first inner rod and a second outer rod, said inner arm rod slidable in said second outer rod, further comprising means for securing said inner rod to said second outer rod whereby said inner rod is fixedly secured in said second outer rod.

9. The apparatus of claim 1, said means for clamping further comprising a U-shaped member for receiving a mounting means thereinbetween, further comprising means for securing said U-shaped member onto said mounting means.

10. The apparatus of claim 8, said means for securing said first inner rod to said second outer rod further comprises a threaded means.

11. The apparatus of claim 1, further comprising a means for pivoting disposed intermediate said means for clamping and said lower distal end of said rod whereby said rod is pivotable through an angle of about 180 degrees.

* * * * *